United States Patent [19]

Lestradet

[11] 4,301,944

[45] Nov. 24, 1981

[54] SPREADER DEVICES HAVING A CONTROLLED OUTPUT

[76] Inventor: Maurice C. J. Lestradet, 291, av. du Marcehal de Lattre de Tassigny, 51230 Fere Champenoise, France

[21] Appl. No.: 28,431

[22] Filed: Apr. 11, 1979

[30] Foreign Application Priority Data

Dec. 28, 1978 [FR] France ............................ 78 36666

[51] Int. Cl.³ .................... A01C 15/00; B05B 9/06
[52] U.S. Cl. ................................. 222/55; 222/614; 239/127; 239/156
[58] Field of Search ........................... 222/613–625, 222/55, 61; 239/155, 156, 124, 127, 677

[56] References Cited

U.S. PATENT DOCUMENTS

| | | | |
|---|---|---|---|
| 3,529,772 | 9/1970 | Brodersen | 239/157 |
| 3,550,854 | 12/1970 | Fischer | 239/155 |
| 3,877,645 | 4/1975 | Oligschlaeger | 239/155 |
| 4,023,020 | 5/1977 | Lestradet | 222/614 X |
| 4,193,547 | 3/1980 | Ballu | 222/614 X |

FOREIGN PATENT DOCUMENTS 2738263  3/1978  Fed. Rep. of Germany ...... 239/156

Primary Examiner—F. J. Bartuska
Attorney, Agent, or Firm—Fidelman, Wolffe & Waldron

[57] ABSTRACT

A vehicle mounted liquid spreading device adapted to deliver selected, essentially constant, volumes of liquid per unit area over a range of vehicle speeds. The device operates to adjust the pressure in the liquid distribution system as a function of vehicle speed by comparing the pressure in the distribution system to a pressure proportional to the vehicle speed and utilizing a signal so obtained to control a liquid by-pass valve.

22 Claims, 17 Drawing Figures

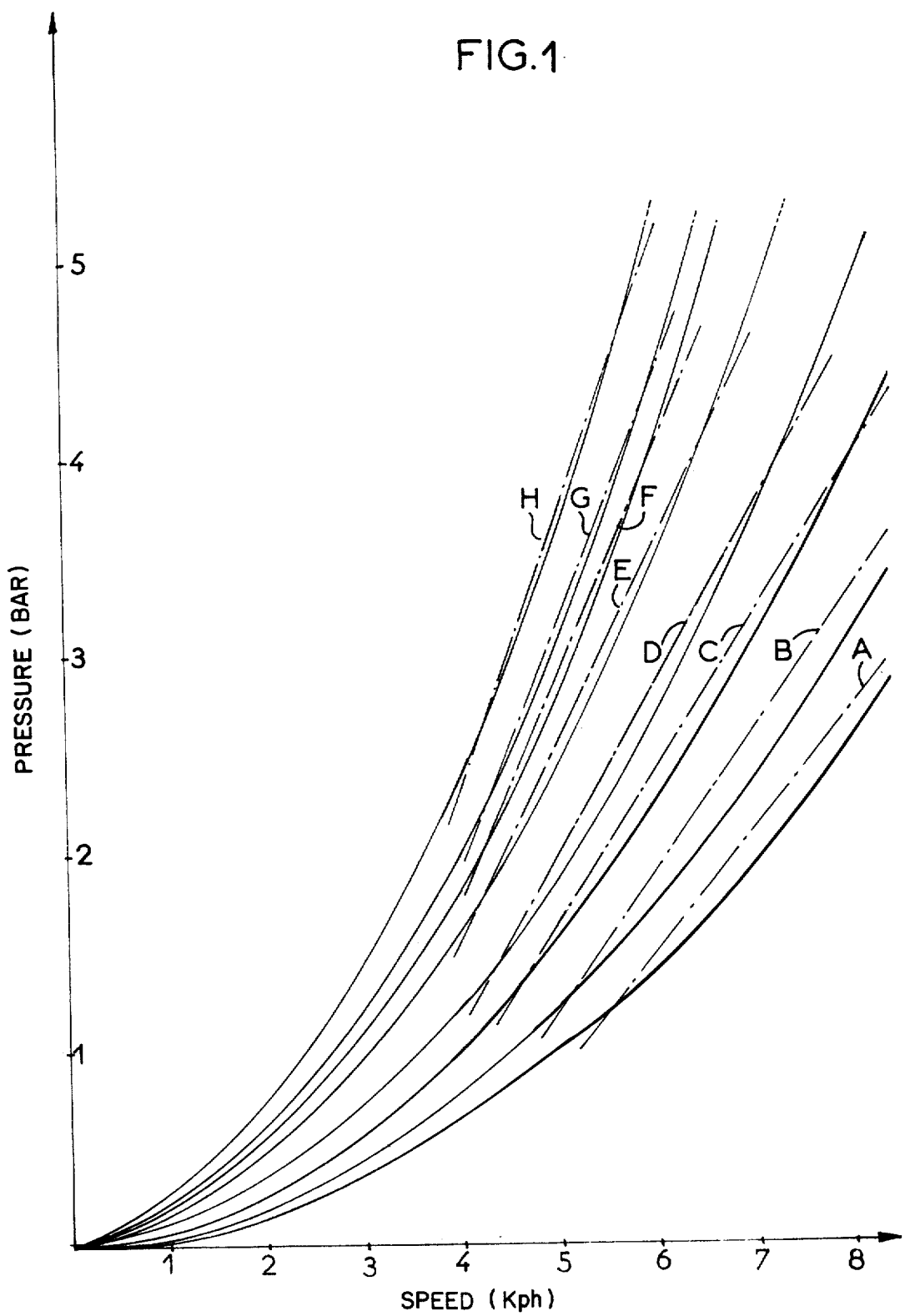

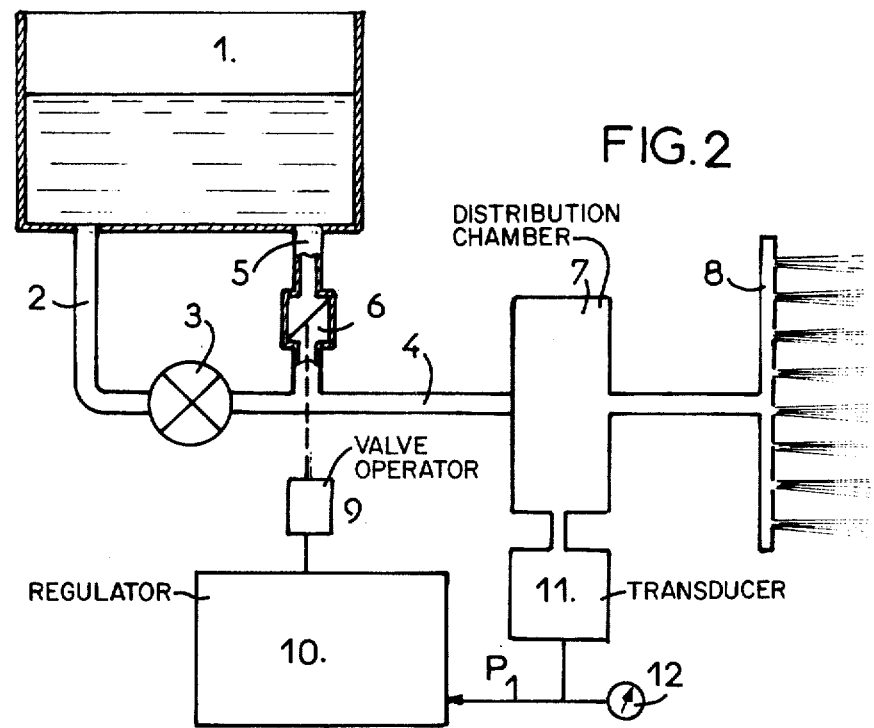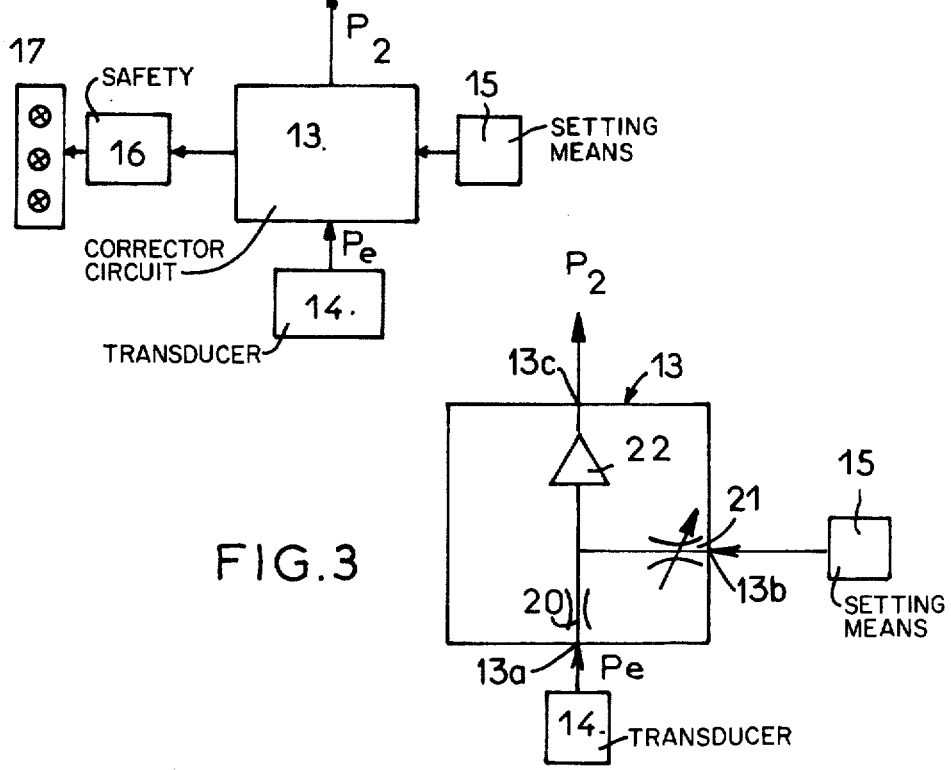

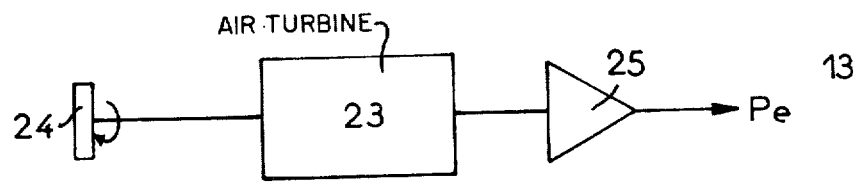
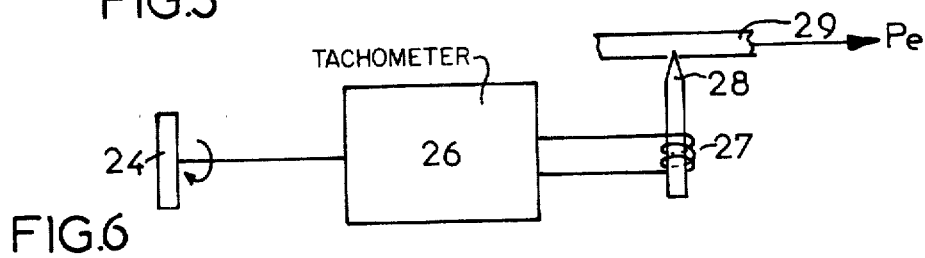
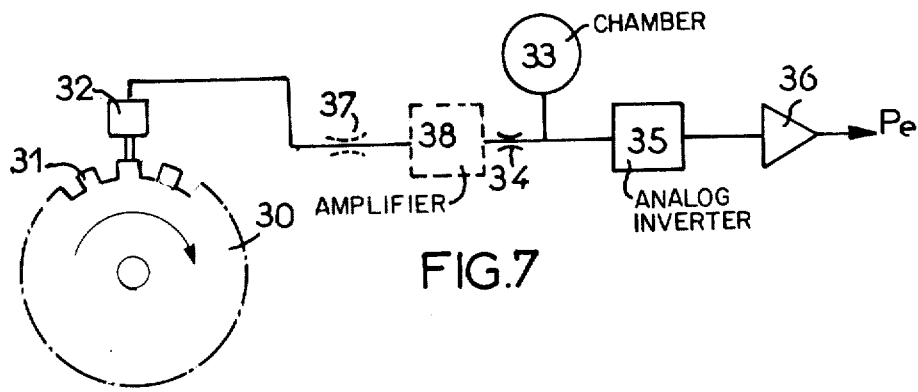
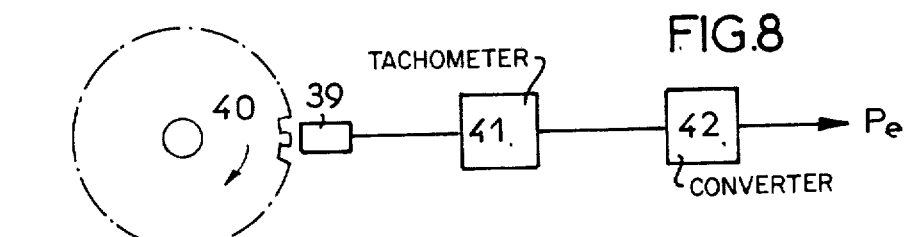
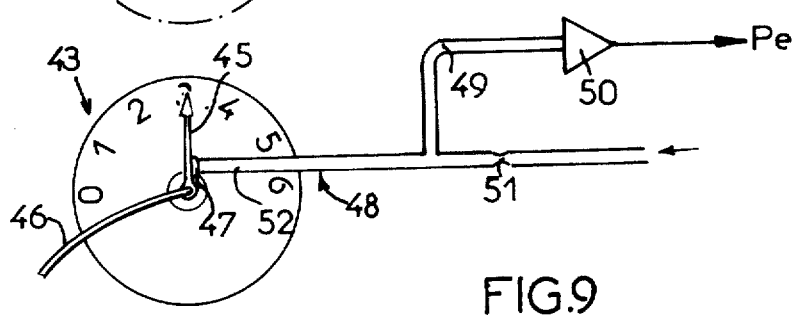

SPREADER DEVICES HAVING A CONTROLLED OUTPUT

The present invention relates to a wheeled vehicle provided with a spreader device whose input is controlled by the speed of displacement of the vehicle. Such a vehicle may be employed for agriculture, for example for spraying liquids and in particular fertilizers or insecticides.

Vehicles of this type usually require that the operator use a table which is drawn up in advance and permits the determination of, on one hand, the type of spray nozzles to use in the spreader system, and on the other, the mean rate of spraying as a function of the amount of product to be spread. Taking into account this data, a proportional regulation circuit controls the valve around pre-set values.

Consequently, the user of the machine is made to carry out a certain number or operations which it is of interest to minimize by rendering them automatic as far as possible.

For the purpose of overcoming these drawbacks the applicant has already proposed, in his French Pat. No. 7 412 009 corresponding to U.S. Pat. No. 4,023,020, a spreader device whose output is controlled by the speed of displacement of the vehicle equipped with the device.

This device permits the spreading of an amount of product which is in fact proportional to the speed of the vehicle, in particular owing to a comparison between a reference signal delivered by a computer unit and a feedback signal, the result of the comparison acting on the means regulating the output.

The reference signal is a function of the speed of the vehicle and of the amount of product to be spread per unit area and the feedback signal is delivered by a pressure gauge which permanently measures the pressure in a distribution chamber for the product.

The technology employed in this device is electronic and said comparison is carried out on electric signals delivered by suitable transducers.

The object of the present invention is to simplify such a system by substituting for the electronic technology a simpler, cheaper and more reliable pneumatic technology.

According to the invention, there is provided a vehicle supported by wheels and provided with a spreader device whose output is controlled by the speed of displacement of the vehicle, said device comprising a tank containing a liquid product to be spread, a pump connected to the tank and to a spreader system, a regulating valve inserted in a regulation pipe connecting the tank to the supply pipe connecting the output of the pump to the spreader system, wherein the valve is controlled by an operator actuated by a regulator which permanently compares the pressure prevailing in the spreader system and a pressure which is proportional to the speed of displacement of the vehicle, the last mentioned pressure being delivered by a transducer which converts said into a directly proportional pressure, there being interposed between the transducer and the regulator a corrector circuit which converts the pressure signal received into a pressure signal whose variation as a function of the speed occurs in accordance with a law which is very substantially identical to the theoretical law of variation of the pressure of the liquid in the spreader system as a function of the speed of displacement of the vehicle.

More precisely, the law of variation of the pressure signal delivered by said corrector circuit as a function of the speed of displacement is a straight line having the same slope as the mean straight lines of approximation of the theoretical curves of variation of the liquid pressure in the spreader system as a function of the speed of displacement and according to the parameter of concentration of sprayed liquid by hectar, said approximation being effected on the parts of theoretical curves corresponding to a speed of displacement higher than 4 kph and to a spreading pressure exceeding 1 bar.

In this way there is obtained a relatively precise, simple and reliable system whereby it is possible, for a given concentration of liquid sprayed per hectar which is set in the regulator device, to obtain a variation in the spreader pressure as a function of the speed of displacement of the vehicle which is very close, that is to say with a sufficient approximation, to the corresponding theoretical curve under normal practical conditions of the spraying of in particular agricultural fertilizers.

More details of the structure and operation of the device of the invention will now be given with reference to the accompanying drawings in which:

FIG. 1 is a diagram of a family curves of pressure as a function of the speed;

FIG. 2 is a general schematic of the device of the invention;

FIG. 3 is a schematic of the principle of operation of the corrector circuit of the device of FIG. 2;

FIG. 5 represents diagrammatically a first modification of the speed/pressure transducer;

FIGS. 6 to 10 represent other modifications of the speed/pressure transducer;

FIG. 1 shows a family curves of pressure as a function of speed.

Figure 4:
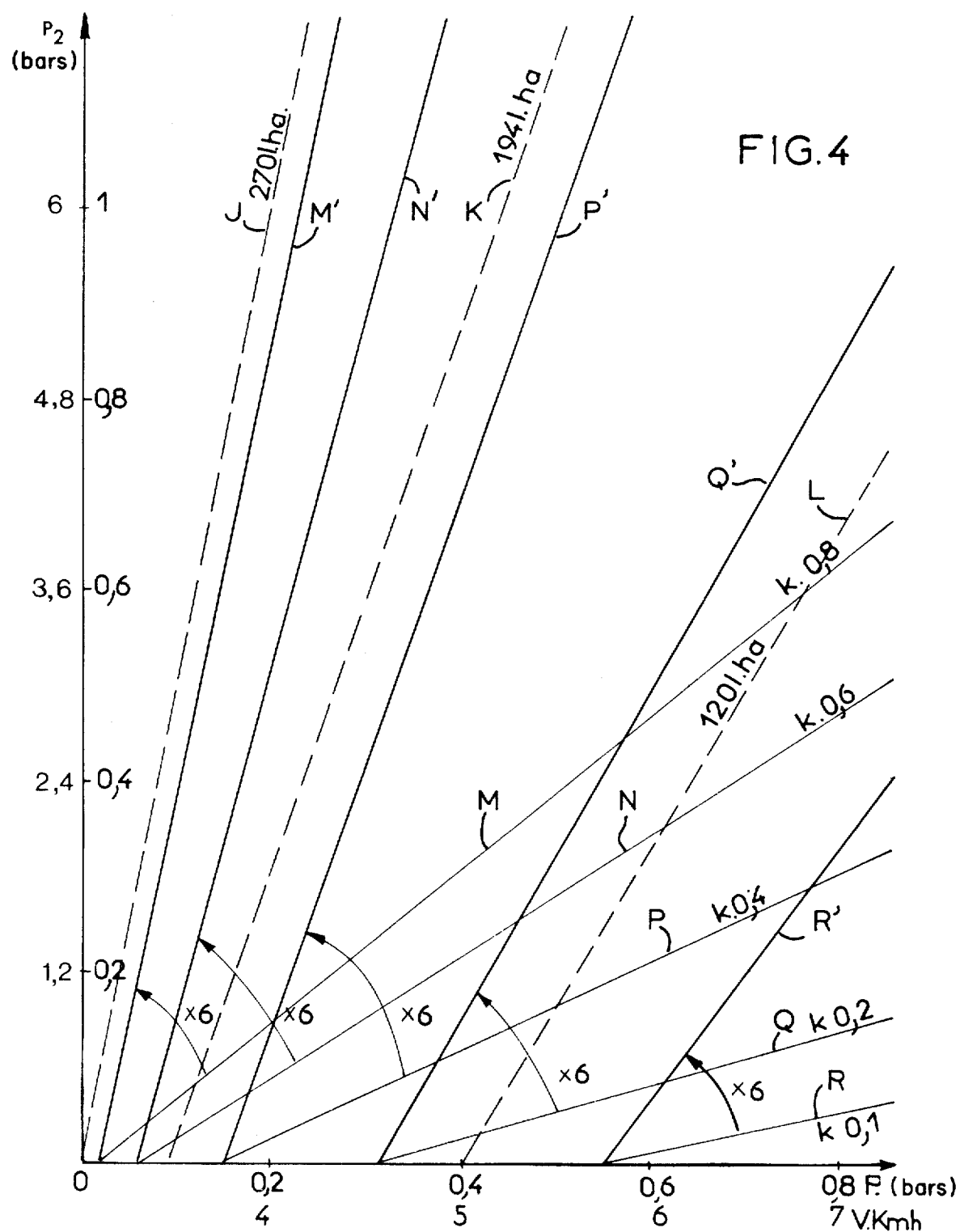
FIG. 4 is a diagram of the various pressure curves illustrating the principle of operation of the device of the invention.

The pressure (in bars) is that prevailing in a distribution chamber immediately upstream of the spreader system and the speed (in kph) is that of the vehicle carrying the spreader system.

The curves of FIG. 1 illustrate the relation:

$$P = (Q \times v)^2 / 1200 \, K$$

in which Q is the amount of liquid spread (expressed in liters), v is the speed of the vehicle and K is a coeffficient which is a characteristic of the nozzles employed in the spreader system.

Each of the curves of FIG. 1 correspond to a given amount of product spread per hectar.

These curves of course have the shape of a parabola, but it is of interest to note that above a certain speed (4 kph) and a certain pressure (1 bar) said curves may be roughly likened to straight lines, that is to say that, in the normal zones of use (speed and pressure), said curve portions, represented in full lines in FIG. 1, may be replaced by segments of mean straight lines with an acceptable coefficient of approximation. Such segments of a straight line A to H are shown in FIG. 1.

Moreover, it will be noted that the lines A to H are of the form $y = ax - b$, the slope a of these lines being the steeper as the amount of product spread per hectar is greater.

An explanation will now be given of the manner in which this point may be exploited with reference to FIG. 2 which illustrates the general schematic of the device according to the invention, and to FIG. 4 which represents families of curves illustrating the principle of operation of this device.

FIG. 2 shows at 1 a tank containing the liquid to be sprayed which is connected by a pipe 2 to the imput of a pump 3, which is for example a centrifugal pump the output of which is connected to a supply piping 4. The latter is moreover connected to the tank 1 through a regulation pipe 5 which is provided with a regulation valve 6. It is also connected at the downstream end to a distribution chamber 7 to which it supplies the liquid to be sprayed, the outlet of this chamber being connected to a spreader system 8 provided with spraying means such as nozzles (not shown).

The opening of the regulation valve 6 is controlled by an operator which is symbolically represented at 9.

A pneumatic regulator 10 controls the operator 9 and receives a first signal P1 in the form of a fluid pressure, which is preferably air coming from a pressure sensor 11.

The sensor 11 is a transducer which converts the pressure prevailing in the supply chamber 7 into a fluidic signal of proportional pressure. A pressure gauge 12 for reading off the pressures is disposed at the output of the sensor 11.

The regulator 10 receives a second signal P2 in the form of a fluid pressure (air) coming from a corrector circuit 13. The latter receives a pneumatic signal which is proportional to the speed of displacement of the spreader vehicle and is delivered by a transducer circuit 14.

The corrector circuit 13 is also connected to means 15 for setting the correction to be effected and to a safety unit 16 provided with a display device 17 which indicates to the driver of the vehicle a normal state, or an order to accelerate or slow down. This display device may be advantageously constructed in the form of an assembly of three light indicators one of which is always illuminated to indicate the actual state of operation. The principle of operation of the device shown in FIG. 2 is the following.

The regulator 10 automatically controls the extent of the opening of the valve 6 as a function of the difference between two signals (preferably formed by air pressures) one (P1) of which represents the liquid pressure effectively prevailing in the spreader system 8 (and the distribution chamber 7) and the other (P2) of which represents the speed of displacement of the machine carrying the spreader ramp, with respect to the ground.

According to the invention, the signal P2 representing the speed of displacement of the machine will be acted upon so as to correct it by means of the circuit 13 in such manner that the family of curves representing the pressure in the spreader system 8 as a function of the speed of displacement and in accordance with various amounts of liquid sprayed per hectar, is as close as possible to the family of curves illustrated in FIG. 1.

In other words, the linear curve of the signal of the pressure delivered to the correction circuit 13 by the transducer device 14, which signal is directly proportional to the speed of displacement, will have its slope changed for a given concentration per hectar in such manner that the new straight line thus obtained by very substantially parallel to the curve of the family of FIG. 1 which relates to the same concentration per hectar.

In order to illustrate this procedure, there has been shown in FIG. 4, on one hand, the theoretical curves J, K, L of spreader pressure as a function of the speed of displacement for three different concentrations per hectar and, on the other, the three corresponding curves M′ P′ Q′ obtained in accordance with the invention.

FIG. 4 illustrates the corrective function of the corrector circuit 13 whose schematic is given in FIG. 3. The corrector circuit 13 receives an input pressure Pe which comes from the transducer 14 and is directly proportional to the speed of displacement of the vehicle.

The circuit 13 is formed by an input 13*a*, a first fixed constriction or throttle valve means 20, a second adjustable constriction or throttle 21 (controlled by the setting means 15) disposed in parallel (connected to the atmosphere at 13*b*) an output 13*c* and a pneumatic amplifier 22.

This circuit 13 permits the obtainment of curves of type P2 (output pressure)$=a$ Pe$-b$, namely of the type $y=ax-b$.

Curves of this family are shown at M, N, P, Q and R in FIG. 4.

In FIG. 4 there is plotted, as ordinates, the pressure P2 of the output of the corrector circuit and, as abscissae, the input pressure Pe and the corresponding speed of the machine in kph.

The curves M to R correspond to the ratios between the speed and the pressure Pe indicated in FIG. 4, namely 4 kph for 0.2 bar; 5 kph for 0.4 bar and so on, expressed linearly. This particular correspondence between the speed and input pressure P3 is given by the conversion ratio of the transducer 14 and is of course adjustable. The effect of a modification of this ratio of correspondence will be seen hereinafter.

The curves M to R translate the value of the pneumatic signal immediately upstream of the amplifier 22 of the corrector circuit 13 as a function of the input pressure with P2 as a coefficient of correction.

The function of the amplifier 22, whose gain is chosen for this purpose, is to convert the curves M, N, P and R into curves M′, N′, P′ and R′ respectively. In the case of FIG. 4, the gain of the amplifier 22 is 6 and results in curves which are very substantially parallel to the desired theoretical curves, such as the curves, J, K, L, to which the curves M′, P′, Q′ correspond respectively.

To summarize, it is the choice of the correspondence between the speed and pressure at the input of the corrector device 13 and the choice of the gain of the amplifier 22 of said corrector device which permit sending to the regulator 10 signals which substantially translate with fidelity the pressure curves of the liquid to be sprayed as a function of the speed of displacement of FIG. 1, that is to say, the straight line segments of approximation A to H, for speeds higher than 4 kph and a pressure higher than 1 bar, since it has been seen that, below these limit values, the approximation of the parabolic curves in the form of segments of a straight line departs excessively from reality.

The ratio between the speed of displacement and the input pressure Pe of the corrector circuit 13 indicated in FIG. 4 is an optimal ratio which permits the theoretical curves to be followed as closely as possible. However, it is possible to substantially deviate from the mentioned values with no harmful consequences.

The device shown schematically in FIG. 2 operates in the following manner.

Assuming that the pressure prevailing in the spreader system 8, that is to say, also in the chamber 7, is that which corresponds to the real speed of displacement with respect to the ground of the machine carrying the system for the desired concentration per hectar, the regulator 10 detects null difference between the pressures P1 and P2 and maintains, by means of the operator 9, the valve 6 in the position in which it was put.

Now, for example, if the machine has just slowed down, the transducer 14 translates this slowing down by a drop in the pressure sent to the corrector circuit 13 which delivers to the regulator 10 a signal P2 less than P1.

The regulator 10 detects this disequilibrium and acts on the operator 9 which shifts the valve 6 in the direction for reducing the output flow, the extent of this correction of the flow through the valve 6 following a curve which is very close to the theoretical curve of variation of the spreader pressure as a function of the speed of displacement for a desired concentration per hectar.

Thus, for any relative variation between the speed of the machine and the pressure prevailing in the spreader system, the regulator 10 automatically shifts the valve 6 in such manner as to maintain under all circumstances the selected concentration per hectar which was set at the start of the spraying.

Various embodiments of the essential means of the device shown in FIG. 2 will now be described.

FIGS. 5 to 10 concern various modifications of the transducer 14 which converts the speed of displacement into a pneumatic signal applied to the corrector circuit 13.

FIG. 5 shows schematically at 23 an air turbine driven by a roller symbolically represented at 24 which is rotated by a non-driving wheel (not shown) of the machine carrying the spreader system. The turbine 23 converts the speed of rotation in revolutions per minute of said wheel into a pneumatic signal of a pressure which is proportional to the speed. This signal is applied to a subtracting amplifier 25 which delivers the pressure Pe which is an image of the speed and is applied to the corrector circuit 13.

The air turbine 23 may be a vane-type or gear-type motor.

In either case, clearance must be provided between the vanes or gears and the stator to allow possibility of escape of air there through in the event of a slowing down of the machine carrying the spreader system.

It has been seen hereinbefore that optimal results were obtained for a certain correspondence between the speed of displacement and the pressure Pe applied to the input of the corrector circuit. This correspondence is established at 0.2 bar for 4 kph; 0.3 bar for 5 kph and so on. This makes 3 kph correspond to 0 bar, so that the transducer system 14 must only send a signal Pe when the speed of displacement is higher than or equal to 3 kph. This is the reason why an air substracter or remover is provided and preferably incorporated in the amplifier to eliminate excess air in the event of a speed lower than 3 kph.

However, note that if for a speed of displacement of 4 kph the pressure Pe substantially differs from the desired value of 0.2 bar, this has no serious consequence provided that this pressure remains within the range of 0.2 bar±0.05.

According to another embodiment of the transducer 14 illustrated in FIG. 6, there is used an electric tachometer 26 driven by a mechanical power take-off employing a roller 24.

If the output signal of the tachometer 26 is a continuous voltage, an electro-pneumatic converter, symbolically represented at 27, must be added.

This converter 27 is essentially formed by a coil supplied with current by the tachometer 26 andacting on a plunger core forming a needle valve 28 which closes a pressurized air pipe 29 to a varying extent. The air comes from a tank (not shown) and passes through a fixed constriction or throttle and the output pressure signal Pe of the converter is sent to the corrector circuit 13 directly without amplification.

Indeed, it is unnecessary to provide in this embodiment a fluidic amplifier or subtracter.

The range of operation (200 mb/kph) may be easily regulated by action on the converter 27 an on the zero point (zero pressure for 3 kph).

If the tachometer 26 delivers a variable frequency or voltage, this variable signal must be converted into a continuous signal by means of an integrator circuit which is incorporated in the tachometer upstream of the converter 27.

FIG. 7 shows another embodiment of the transducer system 14.

A pneumatic sensor having a roller has for function to convert the speed into air pressure by means of a disc 30 which has square teeth 31 and is driven in rotation by a roller (not shown) driven by a non-driving wheel of the machine. The teeth 31 pass in front of the nozzle of a pneumatic sensor 32. The latter delivers at its output a signal formed by a pressure in the form of pulses integrated by a chamber 33 which is preceded by a constriction or throttle 34. The signal is then a continuous pressure which is inverted by an analog inverter 35 and then amplified by an amplifier 36 which delivers at its output the signal Pe sent to the corrector circuit 13.

If the output signal of the sensor 32 is delivered at high pressure it acts directly on the constriction 34, but if it is at low pressure there are interposed between the sensor 32 and the constriction 34 a second constriction or throttle 37 and an amplifier 38 following on the latter.

In another modification shown in FIG. 8, there are provided a speed transmitter which delivers a continuous electric signal and electro-pneumatic converter. The transmitter comprises a fixed magnetic sensor 39 disposed in front of a toothed wheel of ferromagnetic material 40 driven by a non-driving wheel of the agricultural machine. The electric pulses delivered by the sensor 39 when the wheel 40 rotates are sent to a tachometer 41 which delivers a signal formed by a continuous voltage and sent to an electro-pneumatic converter 42 of the type of the converter 27 shown in FIG. 6.

The output of the converter 42 delivers the signal Pe.

Here again, this modification does not require an amplifier or subtracter.

When an amplifier (such as 25 or 36) is provided in one of the embodiments of the transducer system 14, it concerns either an amplifier with a zero-setting by an adjusting set-screw or an amplifier associated with a subtracter, both of which enable the excess air to be eliminated when the speed of displacement is lower than a predetermined threshold value, for example 3 kph, as in the presently-described device. It will be understood that any other equivalent device may be employed.

In the embodiment shown in FIG. 9, a speedometer of the type employed on automobiles is employed.

This speedometer 43 has a fixed dial 44 in front of which an indicator needle 45 moves. The latter is driven by a flexible cable system 46 connected to a non-driving wheel of the vehicle.

The spindle of the needle 45 is capable of cooperating with a vane 47 of a nozzle-vane unit 48 supplied with air under pressure. The nozzle-vane unit 48 may be positioned in an adjustable manner relative to the dial 44 so that the needle 45 starts to shift the vane 47 beyond a predetermined speed (for example 3 kph) and in the direction toward the facing nozzle in accordance with an extent which is proportional to the real speed, so that there is obtained at the output 49 of the unit 48 a pressure which is proportional to the speed, this pressure being amplified in the amplifier 50 and delivering the signal Pe.

The zero-setting (for example 0 bar at the output for 3 kph) is consequently easily accomplished by positioning the nozzle-vane unit 48 with respect to the dial 44.

The regulation of the range of operation is achieved by acting on two adjustable constrictions 51 and 52 provided in the unit 48.

The amplifier 50 is required owing to the very low pressures delivered by the nozzle-vane unit 48.

Figure 10:
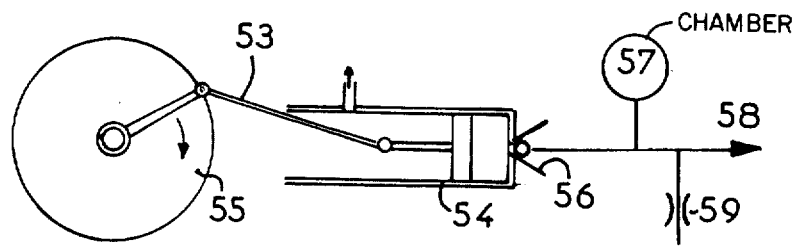

FIG. 10 shows another embodiment of the transducer system 14 which is formed by a link and crank unit 53 actuated by the rod of a pneumatic jack 54.

The unit 53 is shifted by a non-driving wheel (symbolically represented at 55) of the agricultural machine. The chamber of the jack 54 is connected through a check-valve 56 to an integrating chamber 57 so as to provide at 58 a pressure signal which is proportional to the speed of rotation of the wheel 55. A connection to the atmosphere is provided at 59 for allowing a permanent escape of fluid, necessary for compensating for slowing down.

One embodiment of the sensor 11, whose function is to convert the pressure of the liquid in the chamber 7 into a proportional pneumatic signal, will now be described with reference to FIG. 11.

Figure 11:
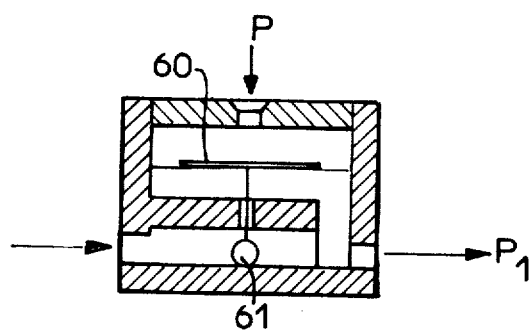
FIG. 11 is a schematic of a type of transducer which may be used for converting the pressure of the liquid to be sprayed into a proportional air pressure.

FIG. 11 shows schematically a booster comprising a diaphragm 60 which is connected to move with a ball valve member 61 interposed in a pneumatic circuit whose input is connected to a compressed air supply pipe and whose output delivers a pressure P1 which is proportional to the pressure of the liquid fertilizer and is applied to the upper side of the diaphragm 60.

This booster, or flow amplifier, permits even the treatment of fertilizer in suspension owing to the large input diameter (fertilizer side of the diaphragm).

Figure 12:
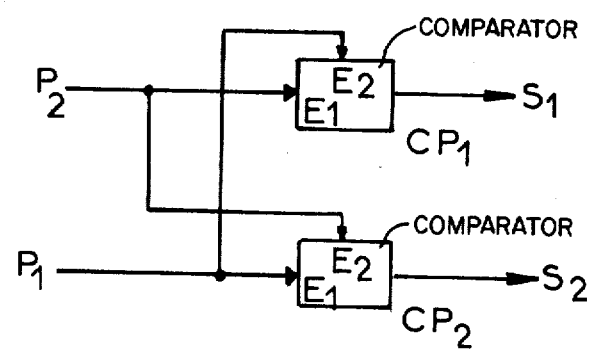
FIG. 12 is a schematic of a first embodiment of the regulator.
Figure 13:
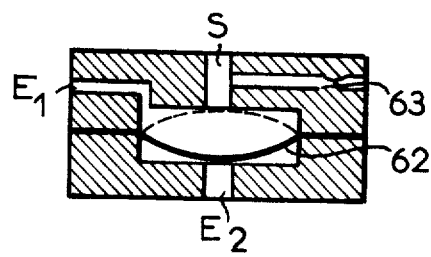
FIG. 13 is a schematic of one of the pneumatic conparators of the regulator of FIG. 12.

FIG. 12 illustrates an embodiment of the regulator 10. This embodiment employs high pressure and comprises two identical comparators CP1 and CP2 of the type shown in FIG. 13.

Such a comparator comprises two inputs E1 and E2 on each side of a diaphragm 62 which is capable of occupying two positions, namely one in which the pressure at E1 is transmitted to the output S (full lines in FIG. 13) and the other in which S is isolated from E1 (diaphragm 62 in the position shown in dotted lines).

The reference signal enters at E1 and the signal to be controlled enters at E2. If E2 is less than E1, E1 appears at S. If E2 is higher than E1, S is isolated from E1. A constriction 63 ensures leakage for zero-setting.

The pressure P1 is applied to the input E1 of the comparator CP2 and to the input E2 of the comparator CP1 and the pressure P2 is applied to the input E1 of the comparator CP1 and to the input E2 of the comparator CP2.

Figure 14:
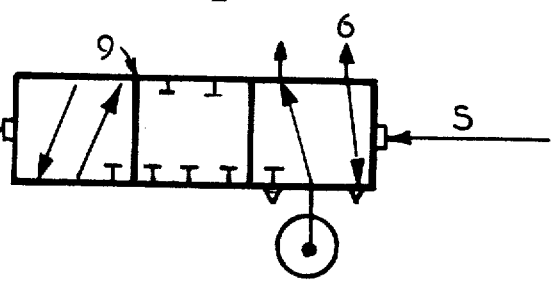
FIG. 14 represents schematically a slide distributor valve acting as a valve operator.

The outputs S1 and S2 are connected, for example, to a ground spool directional valve such as that shown in FIG. 14. Depending on whether a pressure is applied at S1 or S2, the directional valve 9 acts on the valve 6 in the direction for opening or closing. In the event of equality between the pressures at S1 and S2, the directional valve 9 remains unchanged and the position of the valve 6 is unchanged.

In practice, the valve 6 opens or closes until the pressure P1 reaches the pressure P2 for a stabilized speed.

Figure 15:
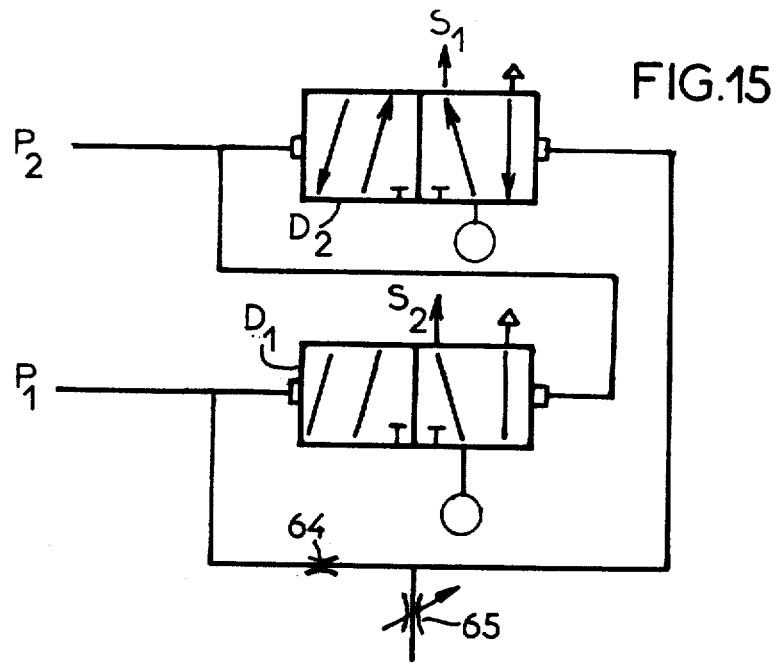
FIG. 15 is a schematic of a second embodiment of the regulator.

Instead of the comparators CP1 and CP2 spool directional valves such as that shown in FIG. 15 may be employed. This modification is of interest since it avoids friction.

The operation of this device is completely similar to that of the device of FIG. 12.

Each pressure P1 and P2 is sent to one side of one of the two directional valves D1 and D2 to the other side of the other directional valve.

Depending on whether P1 is higher or lower than P2, a pressure signal appears at S1 or S2 and consequently closes or opens the valve 6 until there is a return to equilibrium between P1 and P2 in respect of which the operator 9 of the valve 6 no longer acts on the latter in either direction.

As there is no leakage in ground spool directional valves, it is necessary, in order to have a range of stability, to create a disequilibrium by means of a fixed constriction or throttle 64 (in the pipe by way of which the pressure P1 is applied to the valve D2) and an adjustable constriction or throttle 65 connected in parallel. If it is desired to employ low pressure for the regulator 10, known pneumatic regulators are chosen for this purpose which act on a diaphragm valve. Moreover, the pressure P1 is divided so as to have a maximum pressure of 1 bar, and the pneumatic output amplifier 22 of the corrector circuit (FIG. 3) is also dispensed with so as to limit the maximal pressure in the regulator to 1 bar.

The valve 6 is a rotary valve, for example of the quarterturn type, a discovalve or a valve having a ball. However, it is possible to employ a linear valve with a linear operator 9.

Figure 16:
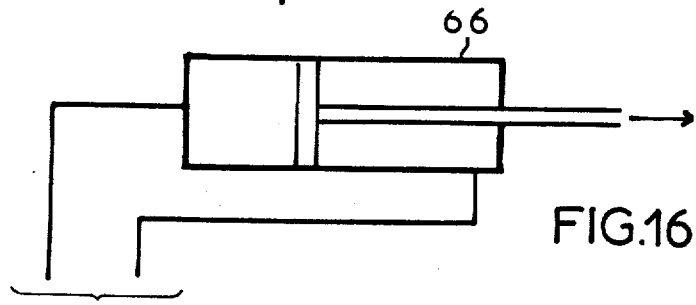
FIG. 16 represents very schematically a pneumatic jack for damping the pumping effects.

As the control or actuating means there is interposed in FIG. 16 a linear jack or cylinder 66 between the directional valve such as that of FIG. 14 and the valve 6. For this purpose, a pneumatic piston jack controlled by means of a rack may be employed. The linear jack may be replaced by a diaphragm jack.

The device of the invention may be regulated, as explained hereinbefore, by the means 15 which is a button acting on the adjustable constriction or throttle 21 of the corrector circuit. The position of the button 15 is indicated by a number of rotations and a fraction of a rotation for example 3 58/100 rotations.

This position corresponds to a certain pressure in the spreader system 8 for a given speed of displacement, a given concentration per hectar and a given type of nozzle.

In order to set the desired pressure, which is read-off from suitable well-known charts, for a given type of nozzle, a given concentration per hectar and a predetermined speed, the agricultural machine is made to travel at the chosen speed and the button 15 is set until the pressure read off the manometer 12 reaches this desired value of pressure read off the chart. The spraying can now start.

The concentration per hectar will remain constant, notwithstanding variations in the speed of displacement owing to the automatic regulating device of the invention.

If the speed has just slowed down, the corrector circuit 13 delivers a pressure P2 which is lower and detected by the regulator 10 which immediately causes the opening of the valve 6 so as to bring the pressure P1 to the level of P2, and inversely if the speed exceeds the pre-set cruising speed.

In this way P1 follows the variations of P2 with fidelity, which variations translate with fidelity the theoretical curves of variations of the spreader pressure as a function of the speed of displacement according to the parameter of the concentration of liquid sprayed per hectar.

If in the course of spreading it is desired to modify the concentration per hectar locally, it is sufficient to place the button 15 in the new position which is determined as before and then simply return to the initial position without having to read the manometer 12.

As it is not always easy to regulate the button 15 while driving owing to the effect of vibrations, it may be advantageous to carry out, while the machine is stationary, a test simulating the speed by introducing in the corrector circuit 13 a pressure Pe' corresponding to the chosen speed.

Figure 17:
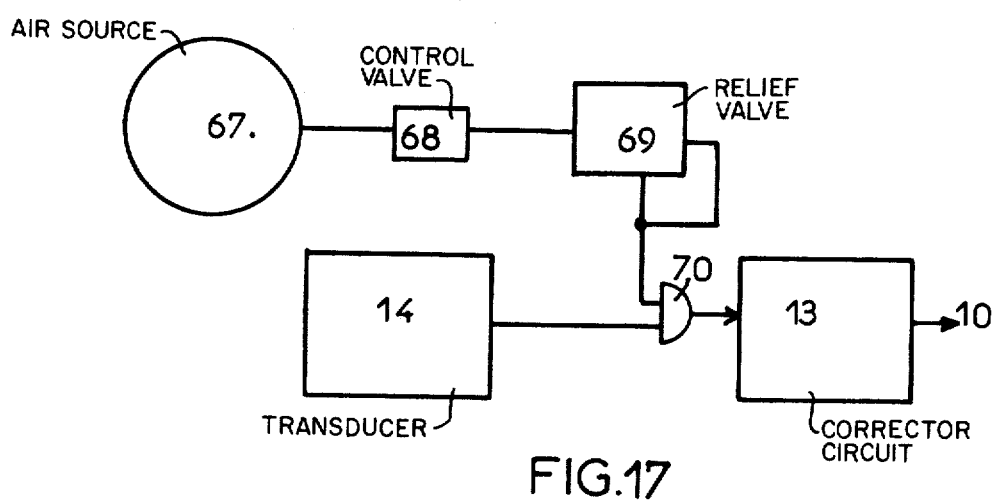
FIG. 17 represents schematically a pneumatic circuit for simulating the speed of displacement of the vehicle provided with the device of the invention.

Such a simulating device has been shown schematically in FIG. 17. This device comprises a source 67 of compressed air, a control valve 68 and a pressure relief valve 69.

A pneumatic OR logic gate 70 is interposed between the input of the corrector circuit 13 on one hand, and the valve 69 and the speed-pressure transducer circuit 14 on the other.

When the simulating circuit is operative, the button 15 is set while the machine is still stationary. Once the button 15 has been suitably positioned, the simulation circuit is put out of action. The spreading can then commence and the spreader pressure is automatically regulated.

It must be understood that the invention is not intended to be limited to the embodiments described hereinbefore and illustrated and encompasses all possible modifications within the scope of the appended claims.

I claim:

1. A spreader device for mounting on a vehicle mounted on wheels so that the output of the spreader device is controlled by the speed of displacement of the vehicle, said device comprising a tank for containing a liquid product to be spread, a pump having an output and an input which is connected to the tank, a spreader system for said liquid product, a supply pipe connecting the output of the pump to the spreader system, a return pipe connecting the tank to the supply pipe, a regulating valve inserted in the return pipe, first transducer means to sense the pressure in said supply pipe and to produce a first fluidic signal proportional to said pressure; second transducer means to sense the displacement speed of said vehicle and to produce a second fluidic signal which is linearly proportional to said displacement speed; corrector fluid circuit means comprising an input connected to said second transducer means to receive said second fluidic signal, an output, a first passageway putting the input in communication with the output, a fluid discharge passageway connected to said first passageway, an adjustable throttle, valve means inserted in said discharge passageway, and setting means for adjusting said throttle valve means whereby to produce at said output a third fluidic signal which is also linearly proportional to said displacement speed but of a selected different slope from said second signal; regulator means adapted to compare said first and said third fluidic signals and to adjust the position of said regulating valve through a valve operator as a function of the difference between said fluidic signals, said third fluidic signal from said corrector fluid circuit means varying in accordance with a slope corresponding to any selected one of a family of linear curves approximating supply pipe pressure plotted as a function of displacement speed of said vehicle at pressures in excess of 1 bar and displacement speeds of said vehicle greater than 4 kph.

2. A device as claimed in claim 1, wherein said second transducer means delivers a pressure signal as a function of the speed of displacement of the vehicle in accordance with a constant predetermined ratio so that the pressure signal is cancelled out for a speed which is not zero.

3. A device as claimed in claim 1 or 2, wherein said second transducer is an air turbine for mechanical connection to a non-driving wheel of the vehicle, an amplifier amplifying the pressure signal delivered by the turbine before it is sent to said corrector circuit.

4. A device as claimed in claim 3, comprising a pneumatic subtracter united with the amplifier so as to deliver a zero pressure signal for a speed of displacement no higher than predetermined threshold speed.

5. A device as claimed in claim 4, wherein the air turbine is a vane-type motor.

6. A device as claimed in claim 4, wherein the air turbine is a gear-type motor.

7. A device as claimed in claim 1 or 2, wherein said second transducer is an electric tachometer delivering an electric signal to an electro-pneumatic converter.

8. A device as claimed in claim 7, comprising a roller drivingly connected to the tachometer driven by a non driving wheel of the vehicle.

9. A device as claimed in claim 7, comprising a fixed magnetic sensor, a ferro-magnetic gear cooperative with the sensor, and means for driving the gear in rotation upon the displacement of the vehicle, the sensor being connected to the tachometer for sending electric pulses thereto.

10. A device as claimed in claim 1 or 2, wherein said second transducer comprises a pneumatic sensor and the device further comprises a toothed disc, a roller drivingly connected to the disc and adapted to be driven by a non-driving wheel of the vehicle and means for averaging, inverting and amplifying the pressure signal delivered by said sensor before it is sent to said corrector circuit.

11. A device as claimed in claim 1 or 2, wherein said second transducer comprises a nozzle-blade unit in combination with a speedometer having a needle.

12. A device as claimed in claim 1 or 2, wherein said second transducer comprises a crank-lever unit and a pneumatic jack drivenly connected to the unit and delivering a pressure signal, and means for averaging and amplifying the pressure signal before it is sent to said corrector circuit.

13. A device as claimed in claim 1 or 2, wherein said first passageway includes a fixed constriction between said input and the connection of said discharge passageway to said first passageway and, if required, a fluid pressure amplifier.

14. A device as claimed in claim 1 or 2, wherein said first transducer includes means for converting the pressure prevailing in the spreader system into a directly proportional air pressure before it is sent to said regulator.

15. A device as claimed in claim 1 or 2, wherein said regulator comprises two identical pneumatic comparators which have two inputs and each receive the two pressure signals to be compared.

16. A device as claimed in claim 1 or 2, wherein said regulator comprises two identical ground spool directional valves each of which valves receives at both ends the two pressure signals to be compared.

17. A device as claimed in claim 15, comprising a ground spool directional valve forming the valve operator and having ends to which the signals of the two outputs of the regulator are sent.

18. A device as claimed in claim 16, comprising a ground spool directional valve forming the valve operator and having ends to which the signals of the two outputs of the regulator are sent.

19. A device as claimed in claim 17, wherein a linear jack or the like is interposed between the regulating valve and the spool directional valve forming the valve operator.

20. A device as claimed in claim 18, wherein a linear jack or the like is interposed between the regulating valve and the spool directional valve forming the valve operator.

21. A device as claimed in claim 1 or 2, further comprising a circuit in combination with the corrector circuit for simulating the displacement of the vehicle at an adjustable predetermined speed whereby the corrector circuit can be regulated when the vehicle is stationary as a function of chosen parameters.

22. A device as claimed in claim 21, wherein said simulating circuit comprises a source of compressed air, a control valve and a pressure relief valve and is connected to the input of the corrector circuit in parallel with the transducer.

* * * * *